(12) United States Patent
Yasuda et al.

(10) Patent No.: US 7,794,158 B2
(45) Date of Patent: Sep. 14, 2010

(54) FABRICATION METHOD OF OPTICAL INTERCONNECTION COMPONENT AND OPTICAL INTERCONNECTION COMPONENT ITSELF

(75) Inventors: Hiroki Yasuda, Mito (JP); Koki Hirano, Hitachinaka (JP); Takami Ushiwata, Hitachi (JP)

(73) Assignee: Hitachi Cable Ltd., Tokyo (JP)

( * ) Notice: Subject to any disclaimer, the term of this patent is extended or adjusted under 35 U.S.C. 154(b) by 0 days.

(21) Appl. No.: 11/867,362

(22) Filed: Oct. 4, 2007

(65) Prior Publication Data

US 2009/0092356 A1    Apr. 9, 2009

(51) Int. Cl.
G02B 6/30 (2006.01)
G02B 6/36 (2006.01)

(52) U.S. Cl. ............... 385/89; 385/49; 385/51; 385/91

(58) Field of Classification Search ........ 385/49, 385/51, 52, 88–92
See application file for complete search history.

(56) References Cited

U.S. PATENT DOCUMENTS

| | | | | |
|---|---|---|---|---|
| 5,357,103 A * | 10/1994 | Sasaki | ........... | 250/227.24 |
| 6,048,107 A * | 4/2000 | Pubanz | ........... | 385/92 |
| 6,132,107 A * | 10/2000 | Morikawa | ........... | 385/89 |
| 6,160,947 A * | 12/2000 | Osugi et al. | ........... | 385/137 |
| 6,389,202 B1 * | 5/2002 | Delpiano et al. | ........... | 385/49 |
| 6,491,447 B2 * | 12/2002 | Aihara | ........... | 385/92 |
| 6,813,418 B1 * | 11/2004 | Kragl | ........... | 385/49 |
| 6,821,027 B2 * | 11/2004 | Lee et al. | ........... | 385/89 |
| 6,827,503 B2 * | 12/2004 | Steinberg et al. | ........... | 385/92 |
| 6,901,185 B2 * | 5/2005 | Sasaki et al. | ........... | 385/33 |
| 7,118,293 B2 * | 10/2006 | Nagasaka et al. | ........... | 385/89 |
| 7,287,914 B2 * | 10/2007 | Fujiwara et al. | ........... | 385/88 |
| 2004/0202477 A1 | 10/2004 | Nagasaka et al. | | |

FOREIGN PATENT DOCUMENTS

| | | | |
|---|---|---|---|
| JP | 63-254406 A | 10/1988 | |
| JP | 4-26803 A | 1/1992 | |

(Continued)

OTHER PUBLICATIONS

Y. Doi, et al., A Coarse-WDM Transmitter/Reciever for 10 Gb/s×4ch Interconnection Using a Silca-Based Planar Lightwave, Conference on Lasers and Electro-Optics, 2004, (CLEO), vol. 1, May 16-21, 2004, 2 pages.

(Continued)

*Primary Examiner*—Daniel Petkovsek
(74) *Attorney, Agent, or Firm*—Mattingly & Malur, P.C.

(57) ABSTRACT

An optical fiber holder 7 which directs an angulated groove 6 in which an optical fiber 4 is disposed to a substrate 2 and overlays the angulated groove 6 on the substrate 2 may be formed first. Next, a guide 8 which guides the optical fiber holder 7 to the position where the optical fiber 4 and the optical device 3 are to be optically coupled to each other is formed on the substrate 2. Next, a 45-degree mirror is formed by dicing the optical fiber holder 7 and the optical fiber 4 together in a state in which the optical fiber 4 is disposed in the angulated groove 6. Finally, the optical fiber holder 7 is overlaid on the substrate 2, and the optical fiber holder 7 is guided by the guide 8.

7 Claims, 9 Drawing Sheets

FOREIGN PATENT DOCUMENTS

| | | | |
|---|---|---|---|
| JP | 4-241477 A | | 8/1992 |
| JP | 10115732 A | * | 5/1998 |
| JP | 11-337777 | | 12/1999 |
| JP | 2001-324649 A | | 11/2001 |
| JP | 2004-246279 A | | 9/2004 |
| JP | 2004-271618 A | | 9/2004 |

OTHER PUBLICATIONS

"A Novel Structure For 10 Gb/s×4ch Optical Interconnection Module" Kenji Suzuki, et al. p. 265, Conference of Electronics Society of Institution of Electronics, 2005 Information and Communication Engineering, Preliminary Report C-3-121.

* cited by examiner

FABRICATION METHOD OF OPTICAL INTERCONNECTION COMPONENT AND OPTICAL INTERCONNECTION COMPONENT ITSELF

BACKGROUND OF THE INVENTION

The present invention relates to a fabrication method of optical interconnection component enabling low-cost and high-precision alignment of component, and to optical interconnection component itself.

In optical communication devices and in optical transceivers used for such communication devices, there is such a case that the component (hereinafter referred to as an optical interconnection component) for fixing the optical fiber to be coupled optically to light emitting devices and light receiving devices (hereinafter referred to as optical devices) is formed on the substrate on which the optical devices are mounted.

As for the fabrication method of the optical interconnection component required to establish a reliable optical coupling between the optical fiber and the optical device, there are two methods; an active method and a passive method. The active method adjusts the relative position between the optical fiber and the optical device by monitoring the light receiving signal in transmitting actually the light through the optical fiber. The passive method adjusts the relative position between the optical fiber and the optical device by using a visually recognizable mark or using a means for adjusting mechanically the relative position, without transmitting actually the light into the optical fiber. The passive method, which resultantly excludes a try-and-error process, is suitable for mass production.

As for the fabrication method for the optical interconnection component using the passive method, such methods as disclosed in the following Patent Reference 1 and Non-Patent Reference 1 are known as prior arts.

In the method of Patent Reference 1, at first, a concave part to be used as the part, in which the optical device is placed and a V-groove to be used as the part in which the optical fiber is disposed, are formed on the silicon substrate by applying an anisotropic etching process, and next, the optical device is installed in the concave part and the optical fiber is disposed into the V-groove so that the end of the optical fiber may be in contact with the optical device at the precise relative position, and finally the optical fiber is fixed with an adhesive material.

In the method of Non-Patent Reference 1, the optical fiber in which a 45-degree mirror is preformed through a dicing process is disposed and fixed in the V-groove formed at the upper structure, and the optical device is fixed at the lower structure, and then, the upper structure and the lower structure are made assembled together so that the optical device may be coupled optically to the optical fiber through the 45-degree mirror. In order to adjust precisely the relative position between the upper structure and the lower structure, a V-groove is formed at the lower structure so as to oppose to the V-groove at the upper structure and a guide pin with its cross-section shaped in a round is disposed between the V-grooves at the upper and lower structures so as to adjust the relative position in the width direction of the V-groove. In order to adjust the relative position in the longitudinal direction of the V-groove, the relative position between the optical fiber and the optical device is adjusted by sliding those structural elements in a semi-passive manner.

[Patent Reference 1] JP 11-337777 A (1999).

[Non-Patent Reference 1] Suzuki et. al. "New Concept of Mount Structure for 10 Gb/s and 4 ch Optical Interconnection Modules" (in Japanese) P. 265, Proceedings from Electronics Society, the Institute of Electronics, Information and Communication Engineers (2005).

BRIEF SUMMARY OF THE INVENTION

In the method of Patent Reference 1, it is difficult to connect between VCSEL (Vertical Cavity Surface Emitting Laser) and the optical fiber. Though the cost of VCSEL is substantially lower than the cost of other optical devices and it is reasonable to apply VCSEL in order to establish the optical interconnection component with low cost, VCSEL is not an optimal solution because it has a difficulty in connecting VCSEL directly to the optical fibers.

Both methods of Patent Reference 1 and Non-Patent Reference 1 require V-grooves. It takes a time to form V-grooves because of applying a dicing process. The longer the length of V-grooves or the more the number of V-grooves, extremely the longer the time for a dicing process.

The method of Non-Patent Reference 1 requires an axial adjustment for adjusting the relative position in the longitudinal direction of the V-groove.

The method of Non-Patent Reference 1 requires such an additional component as guide pin.

An object of the present invention is to solve the above mentioned problems and to provide a fabrication method of optical interconnection component and optical interconnection component itself, which enables low-cost and high-precision alignment of component.

Means for Solving the Problems

According to one aspect of the present invention in order to attain the above object, in connection to the optical interconnection method in which the light emitting face of the optical device is arranged and fixed on the back side of the substrate, the optical fiber is wired on the first surface of the substrate, and a 45-degree mirror is formed on the optical fiber so that the optical fiber may be coupled optically to the optical device, the fabrication method of the optical interconnection component includes a step for forming an optical fiber holder, having at least one angulated groove to which the optical fiber is to be disposed, for directing the angulated groove towards the above substrate and placed on the first surface of the substrate; a step for forming a guide on the first surface of the substrate for guiding the optical fiber holder at a position where the optical fiber and the optical device are to be coupled optically; a step for forming the 45-degree mirror at the optical fiber by dicing the optical fiber holder and the optical fiber together at the state in which the optical fiber is disposed in the angulated groove; a step for disposing the optical fiber holder on the first surface of the substrate; and a step for guiding the optical fiber holder by the guide to the position where the optical fiber and the optical device are to be coupled optically, and fixing their relative position.

The guide may be formed so as to include a top stopper part contacting to the diced top face of the optical fiber holder for fixing the relative position of the optical fiber holder in the longitudinal direction of the angulated groove, and a side stopper part contacting to the edge face of the optical fiber holder for fixing the relative position of the optical fiber holder in the width direction of the angulated groove.

It is allowed that a plurality of angulated grooves more than the number of the optical devices are formed in parallel at the optical fiber holder, and dummy optical fibers may be disposed into the angulated grooves where the optical fibers not coupled to the optical devices are disposed.

It is allowed that a plurality of angulated grooves more than the number of the optical devices are formed in parallel at the optical fiber holder, and electric wires may be disposed into the angulated grooves where the optical fibers not coupled to the optical devices are disposed.

According to the other aspect of the present invention, in connection to the optical interconnection component, which includes a substrate; an optical device with its light emitting face being arranged on the back side of the substrate; an optical fiber wired on the first surface of the substrate; and a 45-degree mirror formed at the optical fiber so as to be coupled optically to the optical device, the optical interconnection component has at least one angulated groove in which the optical fiber is to be disposed; an optical fiber holder for directing the angulated groove towards the above substrate and placed on the first surface of the substrate; a guide formed on the first surface of the substrate for guiding the optical fiber holder at a position where the optical fiber and the optical device are to be coupled optically; the 45-degree mirror at the optical fiber by dicing the optical fiber holder and the optical fiber together at the state in which the optical fiber is disposed in the angulated groove.

The present invention provides the following significant effects;
(1) Establishes low cost, and
(2) Enables high-precision alignment.

DETAILED DESCRIPTION OF THE INVENTION

Now, referring to the attached drawings, the preferred embodiments of the present invention will be described below.

Figure 1:
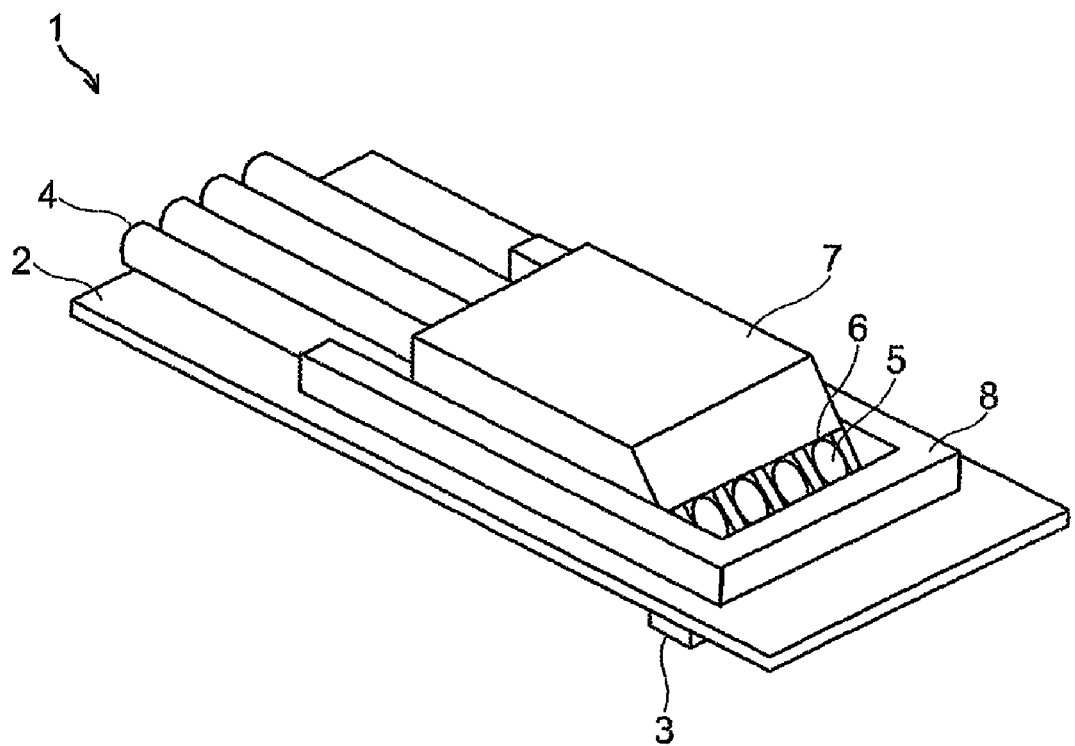
FIG. 1 is a perspective view of the optical interconnection component illustrating one embodiment of the present invention.

As illustrated in FIG. 1, in connection to the optical interconnection component 1, which includes a substrate 2; an optical device 3 with its light emitting face being arranged on the back side of the substrate 2 (the hidden surface illustrated in the drawing); an optical fiber 4 wired on the first surface of the substrate 2; and a 45-degree mirror 5 formed at the optical fiber 4 so as to be coupled optically to the optical device 3, the optical interconnection component 1 has at least one angulated groove 6 in which the optical fiber 4 is to be disposed; an optical fiber holder 7 for directing the angulated groove 6 towards the substrate 2 and placed on the first surface of the substrate 2 through the optical fiber 4 disposed in the angulated groove 6; a guide 8 formed on the first surface of the substrate 2 for guiding the optical fiber holder 7 at the position where the optical fiber 4 and the optical device 3 are to be coupled optically; the 45-degree mirror 5 formed at the optical fiber 4 by dicing the optical fiber holder 7 and the optical fiber 4 together at the state in which the optical fiber 4 is disposed in the angulated groove 6.

It is allowed that a plurality of angulated grooves are formed in parallel at the optical fiber holder 7, and the optical fiber 4 is disposed at the individual angulated groove 6. In this embodiment, four angulated grooves 6 are formed and four optical fibers 4 are disposed. Though the optical fibers 4 are only shown partially in the drawing where they extend up to the end of the substrate 2, the optical fibers may extend up to their required length in the practical use.

A method for fabricating the optical interconnection component 1 shown in FIG. 1, that is, the fabrication method of optical interconnection component according to the present invention will be described below.

Figure 2A:
FIG. 2A to FIG. 2F is a vertical cross-section view of the fiber holder and its composition members illustrating a step of fabricating the optical fiber holder according to the present invention.
Figure 2B:
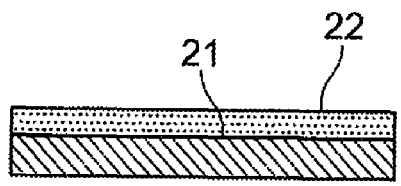
Figure 2C:
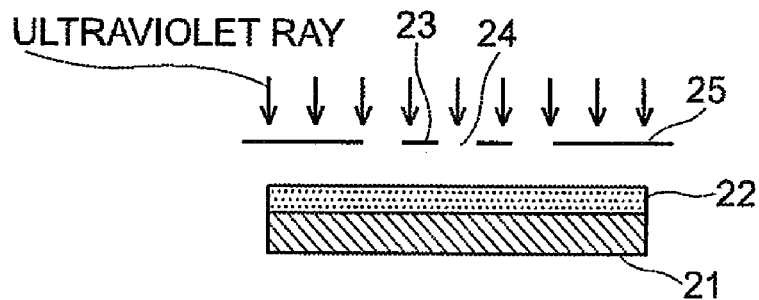
Figure 2D:
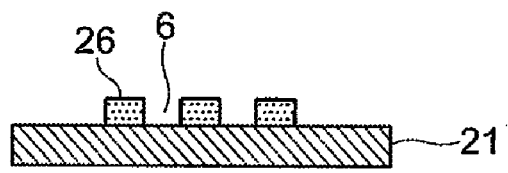
Figure 2E:
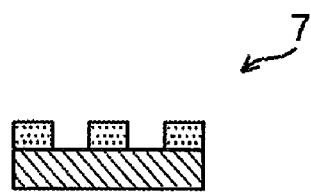
Figure 2F:
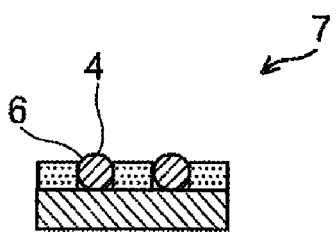

FIGS. 2A to 2F illustrate the steps for fabricating the optical fiber holder 7 by using the photolithographic method. At first, as shown in FIG. 2A, the soda-lime glass 21 is prepared for a solid material used as the base of the optical fiber holder 7. As shown in FIG. 2B, a layer (photo-curable material layer) 22 composed of the photo-curable material is formed on the single side of the soda-lime glass 21. As for the photo-curable material, UV-curable acrylic resin which is cured by the ultraviolet light is used. As shown in FIG. 2C, a pattern mask 25, which has a shielding layer 23 corresponding to the angulated groove and a light-transmitting window 24 corresponding to the banks at both end sides in the width direction of the angulated groove, may be overlaid on the photo-curable material layer 22, and the ultraviolet light may be irradiated from the opposite side of the pattern mask 25. As shown in FIG. 2D, the cured parts are formed as banks 26 by removing the un-cured parts so that the cured part may remain, and then the angulated grooves 6 are formed as the removed un-cured parts between the adjacent banks 26. As shown in FIG. 2E, the optical fiber holder 7 is formed by removing the extended soda-lime glass 21. As shown in FIG. 2F, the width of the individual groove of the optical fiber holder 7 is almost the same as the diameter of the optical fiber 4 and the depth of the individual groove of the optical fiber holder 7 is larger than the radius of the optical fiber 4 and smaller than the diameter of the optical fiber 4 so that the optical fiber 4 may be engaged firmly into the groove 6.

Figure 3A:
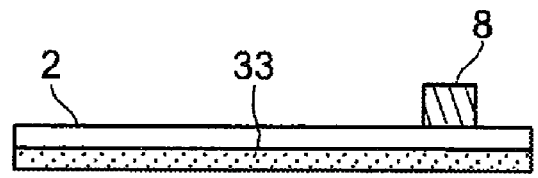
FIG. 3A is a horizontal cross-section view at A-A line of the substrate and the guide according to the present invention.
Figure 3B:
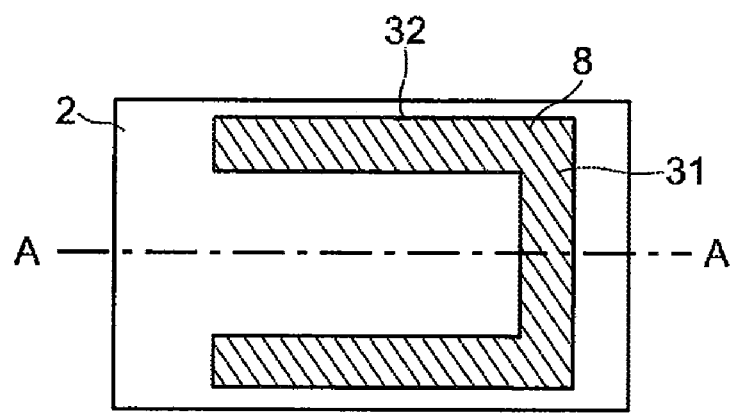
FIG. 3B is a plane view of the substrate and the guide according to the present invention.

As shown in FIGS. 3A and 3B, a guide 8 is provided on the first surface of the substrate 2 on which the optical device 3 is fixed. The guide 8 guides the optical fiber holder 7 to the position where the optical fiber 4 and the optical device 3 are to be coupled optically. In this embodiment, the guide 8 includes the top stopper part 31 contacting to the diced top (to be described later in detail) of the optical fiber holder 7 for adjusting the position of the optical fiber holder 7 in the longitudinal direction of the angulated groove and the side stopper part 32 contacting the side edge face of the optical fiber holder 7 in its width direction for adjusting the position of the optical fiber holder 7 in the width direction of the angulated groove. Note that the optical device 3 is not mounted on the substrate 2 at the fabrication step shown in FIGS. 3A and 3B because the fabrication step for mounting the optical device 3 is not completed yet.

The substrate 2 is FPC (Flexible Printed Circuit) in this embodiment. In addition, the copper-base interconnection 33 is provided on the back side of the substrate 2. The copper-base interconnection 33 includes power lines, earth line and signal lines for the optical devices 3.

In this embodiment, the substrate 2 is formed to be shaped in a rectangle. The top stopper part 31 with its horizontal cross-section being quadrangular is provided in a rectilinear geometry so as to be parallel to the short side of the rectangle substrate 2. The side stopper part 32 with its vertical cross-section (not shown) being quadrangular is provided in a rectilinear geometry so as to be parallel to the long side of the rectangle substrate 2. In this embodiment, a couple of side stopper parts 32 are provided so as to contact to the individual ends of the top stopper part 31, respectively, and thus, the overall guide 8 is shaped in a one-side open square as a projected view onto the substrate. A distance between a couple of side stopper parts 32 is so defined as to be almost equal to the width of the optical fiber holder 7. Thus, the guide 8 may adjust the position of the optical guide holder 7 at its both ends in its width direction.

The guide 8 may be fabricated by the photolithographic method in the similar manner to the method for fabricating the optical fiber holder 7 or fabricated by applying a molding process.

Figure 4A:
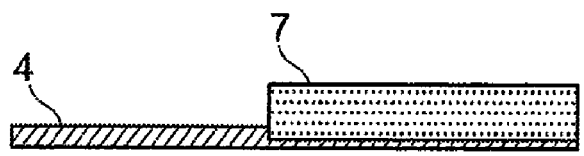
FIG. 4A to FIG. 4D each is a horizontal view of the fiber holder, the substrate and the holder illustrating a step of assembling the optical interconnection component of the present invention.
Figure 4B:
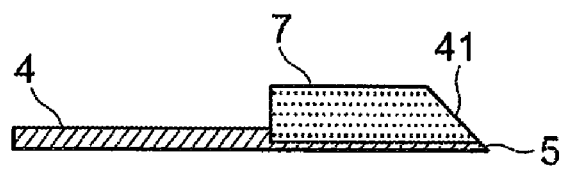

As shown in FIG. 4A, the optical fiber 4 may be disposed into the angulated groove 6 of the optical fiber holder 7. The vertical cross-section of the optical fiber holder 7 is shown in FIG. 2F. In this state, a common inclined plane 41 may be formed by applying a dicing process to the optical fiber holder 7 and the optical fiber 4 together as shown in FIG. 4B. This common inclined plane 41 becomes the 45-degree mirror 5 at the optical fiber 4.

Figure 4C:
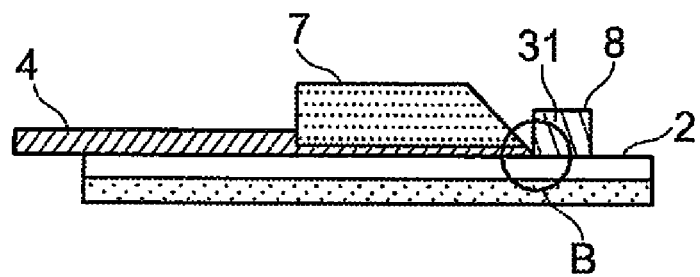

As shown in FIG. 4C, the optical fiber folder 7 may be overlaid on the first surface of the substrate 2. Then, the position of the optical fiber holder 7 is so adjusted as to be guided by the guide 8 to the position where the optical fiber 4 and the optical device 3 are coupled optically to each other. As shown by the circle marked with the symbol B, the position of the optical fiber holder 7 is adjusted by means that the diced top end of the optical fiber holder 7 may contact to the top stopper part 31. Note that, as the substrate 2 is so formed as to define precisely the geometrical relationship between the position of the guide 8 and the position where the optical device 3 are to be disposed, the adjustment of the position of the optical fiber holder 7 with respect to the guide 8 is substantially equivalent to the adjustment of the position of the optical fiber holder 7 with respect to the optical device 3.

Figure 4D:
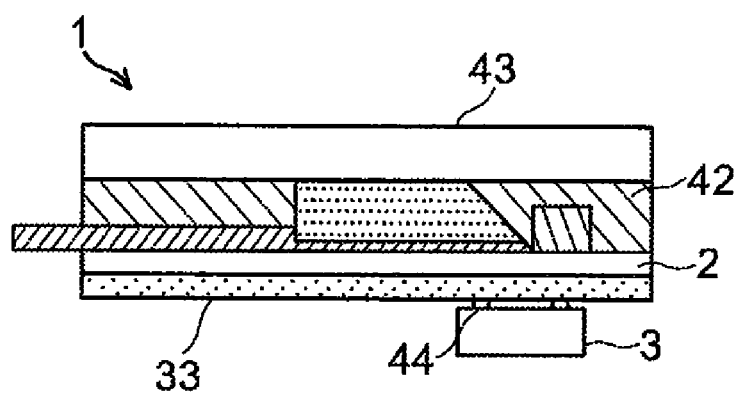

Next, as shown in FIG. 4D, the optical fiber holder 7, the guide 8 and the optical fiber 4 are embedded by the adhesive layer 42 for the cover member, and the cover member 43 composed of a film or a rigid substrate is provided over and bonded to the adhesive layer 42 for the cover member. Thus, the optical interconnection component 1 may be finished finally.

Figure 5A:
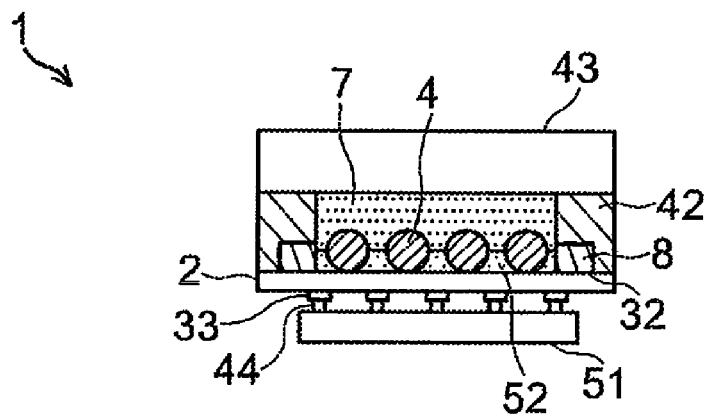
FIG. 5A is a vertical cross-section view of the optical interconnection component of the present invention shown in FIG. 1.
Figure 5B:
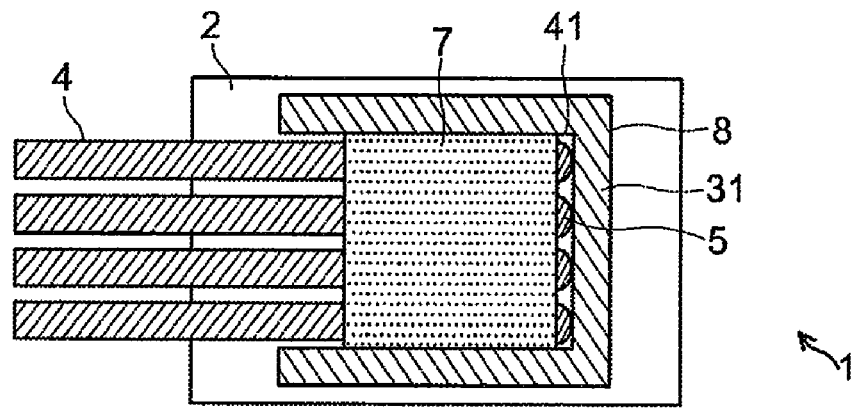
FIG. 5B is a plane view of the optical interconnection component of the present invention shown in FIG. 1.

In the finished optical interconnection component 1 as shown in FIG. 5A, the optical device (not shown) is mounted on the back side of the substrate 2, and the light receiving and/or light emitting regions of the optical device are fixed so as to face to the substrate 2. Note that, in the embodiment shown in FIG. 5A, four optical devices 3 are not separately mounted onto the substrate 23, but the optical device array 51 including four optical devices 3 arrayed in a single line with a designated pitch are mounted onto the substrate 2. The optical fiber 4 is interconnected on the first surface of the substrate 2 with the pitch identical to the pitch of the optical device 3, and the 45-degree mirror 5 is formed at the optical fiber 4. As shown in FIG. 5B, the top of the common inclined plane 41 of the optical fiber holder 7, including the 45-degree mirror 5, contacts to the top stopper part 31 of the guide 8.

As described above, in the fabrication method of the optical interconnection component according to the present invention, the substrate 32 has a guide 8, and the optical fibers 4 are diced together in order to form 45-degree mirrors 5 at the state in which the optical fiber 4 is engaged inside the angulated groove 6 of the optical fiber holder 7, and thus, the optical coupling can be established in a passive method by coupling the optical fiber holder 7 with the guide 8.

According to this method, it will be appreciated that, as the groove formed at the optical fiber holder 7 is an angulated groove 6, the optical fiber holder 7 and the guide 8 can be fabricated by the exposure method or the method applying a molding process, which leads to the higher dimensional accuracy in comparison with the conventional V-groove method. As a result, it will be appreciated that the positioning accuracy can be increased. In addition, it will be appreciated that the fabrication step for forming the V-groove through a dicing process can be removed, and that the fabrication cost can be reduced.

In the fabrication method of the optical interconnection component according to the present invention, by means that the diced top face of the optical fiber holder 7 is made contact to the top stopper part 31 of the guide 8 in order to adjust the position of the optical fiber holder 7 in the longitudinal direction of the angulated groove, the position of the 45-degree mirror 5 is adjusted substantially and resultantly, which can establish higher positioning accuracy in comparison with the position adjustment by way of the downward protruding part formed at the upper structure in the prior art.

In the fabrication method of the optical interconnection component according to the present invention, low-cost VCSEL can be applied to the optical device 3. It will be appreciated that the cost of the optical interconnection component 1 can be reduced.

Next, the method for bonding the optical fiber holder 7 and the substrate 2 together in disposing the optical fiber holder 7 on the first surface of the substrate will be described.

As shown in FIG. 5A, the optical fiber bonding material layer 52 for bonding the optical fiber 4 and the optical fiber holder 7 with the substrate 2 is provided within the region enclosed by the guide 8 on the first surface of the substrate 2. As the depth of the angulated groove 6 (refer to FIG. 2F) of the optical fiber holder 7 is smaller than the diameter of the optical fiber 4, there occurs a spatial gap between the bank 26 of the optical fiber holder 7 (refer to FIG. 2D) and the substrate 2 when the optical fiber 4 contacts to the first surface of the substrate 3. The optical fiber bonding material layer 52 is used for filling this spatial gap and for bonding the optical fiber 4 and the optical fiber holder 7 with the substrate 2.

Bonding materials with a refractive index smaller than the refractive index of the cladding of the optical fiber 43 are used for the optical fiber bonding material layer 52. This material combination provides such an effect that the light led through the optical fibers 4 and reflected at the 45-degree mirror 5 may focus to the coaxial center line of the optical fibers 4. It will be appreciated that the optical coupling between the optical devices of the optical device array 51 and the optical fibers 4 can be established firmly.

Figure 13:
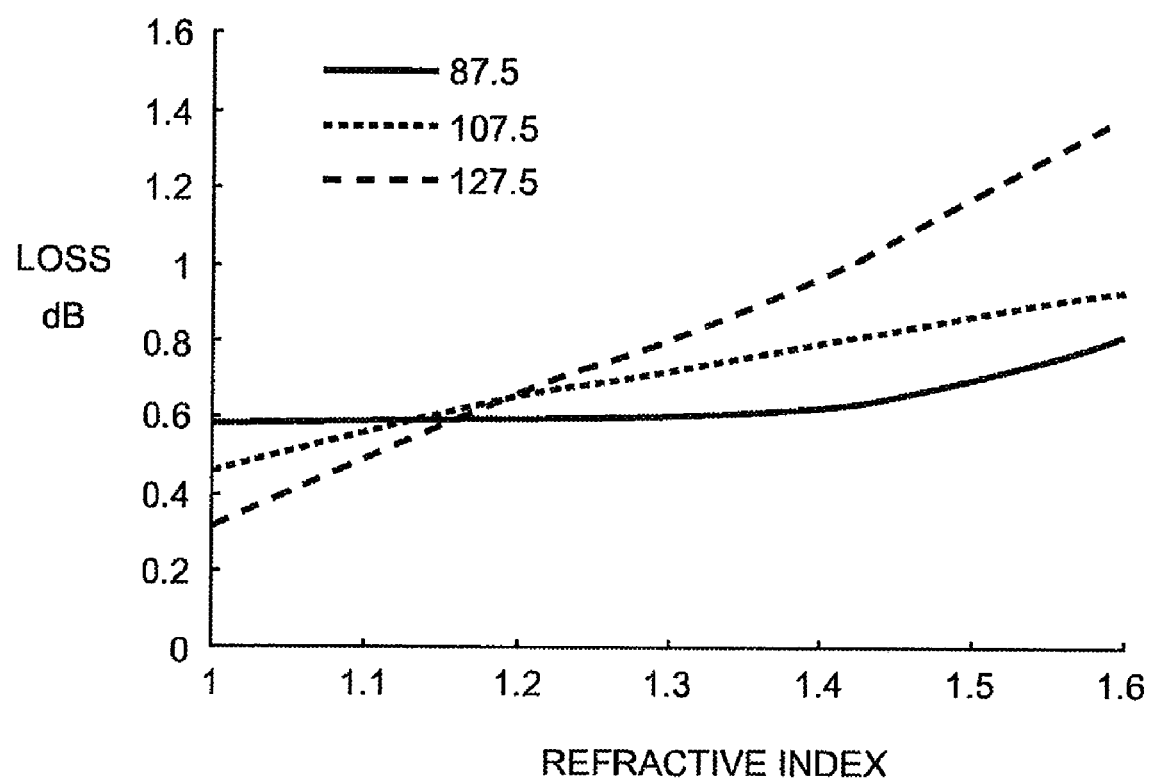
FIG. 13 is a characteristic chart showing the relation between the refractive index and the loss with respect to the distance between optical fiber optical devices.

Now referring to FIG. 13, the relation between the transmission loss and the refractive index and its dependency upon the distance between the optical fiber and the optical device are shown. The horizontal axis represents a refractive index and the vertical axis represents a transmission loss, and the distance between the optical fiber and the optical device is parameterized with 87.5 μm, 107.5 μm and 127.5 μm. As found from the chart, in case that the gap distance between the optical fiber and the optical device is short, the loss does not increase much as the refractive index increases, but in case that the distance between the optical fiber and the optical device is long, the transmission loss increases remarkably as the refractive index increases.

Next, another embodiment will be described.

In the above embodiments, four optical devices 3 are mounted on the substrate 2, and four angulated grooves 6 are formed at the optical fiber holder 7, and then, the optical fiber 4 is disposed into the individual angulated groove 6. Not limiting to this configuration as described in the above embodiment, it is allowed that, one, three or five or more angulated grooves 6 may be formed and the optical fiber 4 may be disposed into the individual angulated grooves 6. It is allowed that the number of the angulated grooves 6 is not equal to the number of the optical devices 3.

Figure 6:
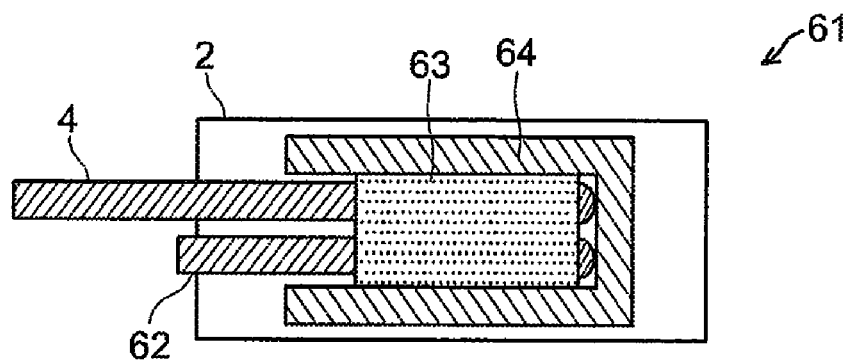
FIG. 6 is a plane view of the optical interconnection component of another embodiment of the present invention.

In the optical interconnection component 61 shown in FIG. 6, the number of angulated grooves (not shown) to be formed is larger than the number of optical devices (not shown), and dummy optical fiber 62 is disposed at the angulated grooves where the optical fiber 4 is not coupled optically to the optical device. Though the optical fiber 4 actually extends longer than illustrated in the drawing, the dummy optical fiber 62 ends at the edge of the substrate 2.

A single optical device is mounted at the optical interconnection component 61. A couple of angulated grooves are formed at the optical fiber holder 63. The width of the optical fiber holder 63 shown in FIG. 6 is narrower than the width of the optical fiber holder 7 of the optical interconnection component 1 shown in FIG. 5B, and thus, the width of the guide 64 is formed to be narrower.

Assuming that the number of angulated grooves is one (1) and that the optical fiber holder 63 is formed with a narrower width so as to accommodate only a single optical fiber 4, the width of the optical fiber holder becomes further narrower than the width of the case shown in FIG. 6. In this assumption, the optical fiber holder 63 may be loosen (not firmly fixed) at the substrate 2 in the roll angle direction (the rotating angle on the axis of the optical fiber 4), in the pitch angel direction and in the yaw angle direction. In case that a tensional stress occurs in a single optical fiber 4, the optical fiber holder 63 itself tends to be twisted in the roll angle direction.

As shown in FIG. 6, if the width of the optical fiber holder 63 is increased by forming additional angulated grooves, a loosen state of the optical fiber holder 63 in the roll angle direction, the pitch angle direction and the yaw angle direction can be improved, which makes the optical fiber holder 63 tend to be directed in parallel to the substrate 2 and the guide 64. In addition, as the width of the optical fiber holder 63 is increased and thus its rotational movement in the roll angle direction may be reduced. Furthermore, its rotational movement in the roll angle direction can be limited due to the dummy optical fiber 62 added. In the fabrication process, when engaging the optical fiber holder 63 into the guide 64, the optical fiber holder 63 may be placed on the substrate 2 and then the optical fiber holder 63 may be engaged into the guide 64 by sliding the optical fiber holder 63. In this engaging operation, as the optical fiber holder 63 is supported by both of the optical fiber 4 and the dummy optical fiber 62 and maintained to be horizontally flat before the optical fiber holder 63 is engaged into the guide 64, it will be appreciated that the optical fiber holder 63 can be disposed more smoothly.

In the above embodiment, a couple of side stopper parts 32 are formed at the holder 8 and the holder 8 is shaped in a one-side open square. It is allowed that a single side stopper part 32 is formed at the holder 8 and the holder 8 is shaped in an L-letter, which also enables to define and adjust the positions in the longitudinal direction and in the width direction.

Figure 7:
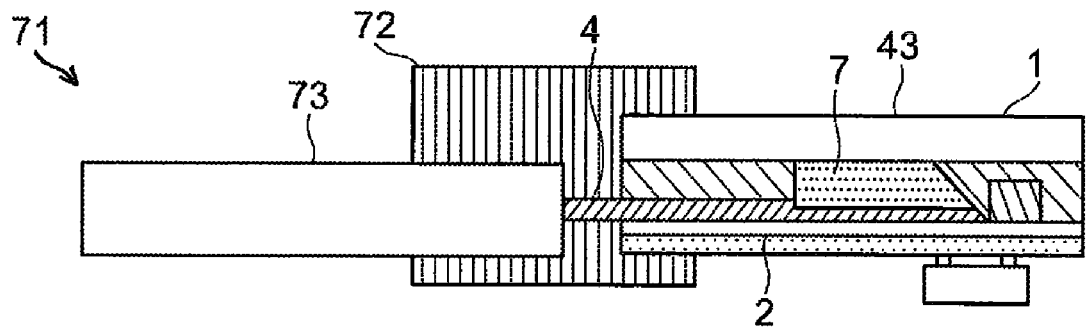
FIG. 7 is a horizontal cross-section view of the optical interconnection component of another embodiment of the present invention.

The optical interconnection component 71 shown in FIG. 7 is fabricated in such a manner that the optical fiber protection member 72 is provided at the optical interconnection component 1 shown in FIG. 4D. The fiber cladding 73 for covering the outside of the optical fiber 4 is provided at the optical fiber 4 extending from the edge of the substrate 2 at the optical interconnection component 1. The fiber cladding 73 of the optical fiber 4 connected to the substrate 2 is peel-off partially. Owing to this configuration in which the substrate 2 and the optical fiber holder 7 are integrally molded, a bear part of the optical fiber 4 is formed between the end part of the fiber cladding 73 and the end part of the optical fiber 4 covered by the cover member 43. This bear part of the optical fiber 4 is not mechanically supported by any member.

The optical fiber protecting member 72 is provided in order to reduce the stress concentration on the bear part of the optical fiber 4. The optical fiber protecting member 72 is formed so as to cover the outside of the optical interconnection component 1 including the end parts of the substrate 2 and the cover member 43 and the outside the end of the optical fiber cladding 73. This configuration protects mechanically the bear part of the optical fiber 4.

Figure 8:
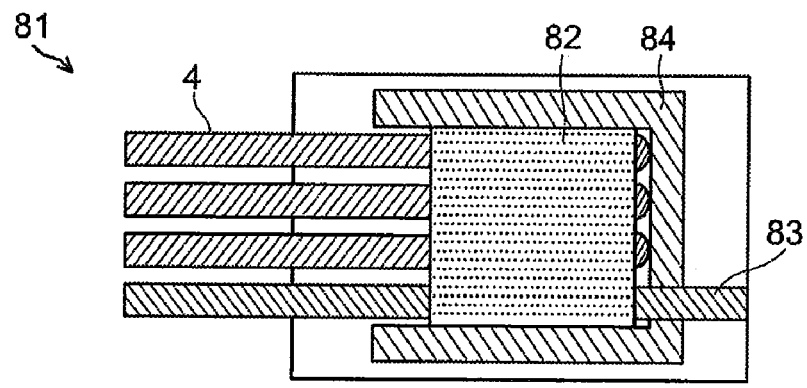
FIG. 8 is a plane view of the optical interconnection component of another embodiment of the present invention.

In the optical interconnection component 1 shown in FIG. 8, four angulated grooves (not shown) the number of which is more than three (3), in which three (3) is the number of the optical devices (not shown), are formed at the optical fiber holder 82, and the electric wire 83 is disposed at the angulated groove located at the position where the optical fiber 4 is not coupled to the optical device. Note that the electric wire 83 extends outside the both ends of the substrate 2, which is not shown in the drawing. The guide 84 has a hole or a groove through which the electric wire 83 is routed.

This optical interconnection component 1 realizes such a transmission method that the high-speed signal (optical signal) can be transmitted through the optical fiber 4 and that the low-speed signal (electric signal) can be transmitted through the electric wire 83.

Figure 9:
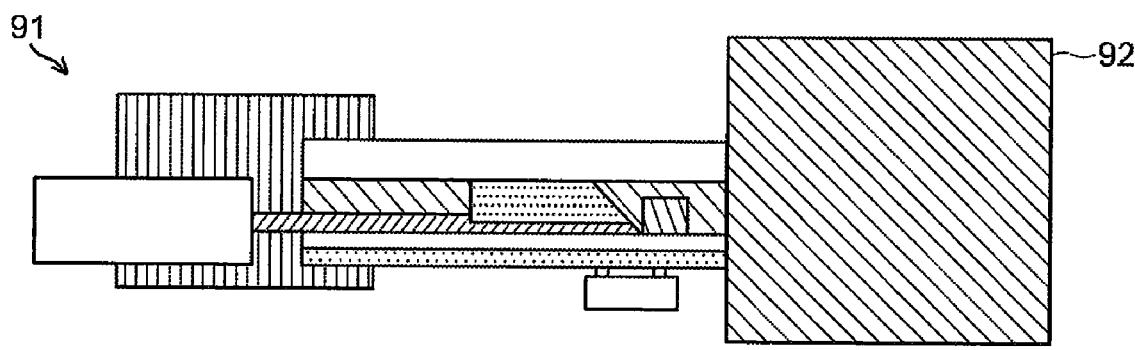
FIG. 9 is a horizontal cross-section view of the optical interconnection component of another embodiment of the present invention.

The optical interconnection component 1 shown in FIG. 9 connects to another electric wiring through the electric connector 92 and exchanges the electric signal converted photo-electrically by PD and the electric signal data before converted photoelectrically to VCSEL. The electric connector 92 can facilitate a signal connection operation.

Figure 10:
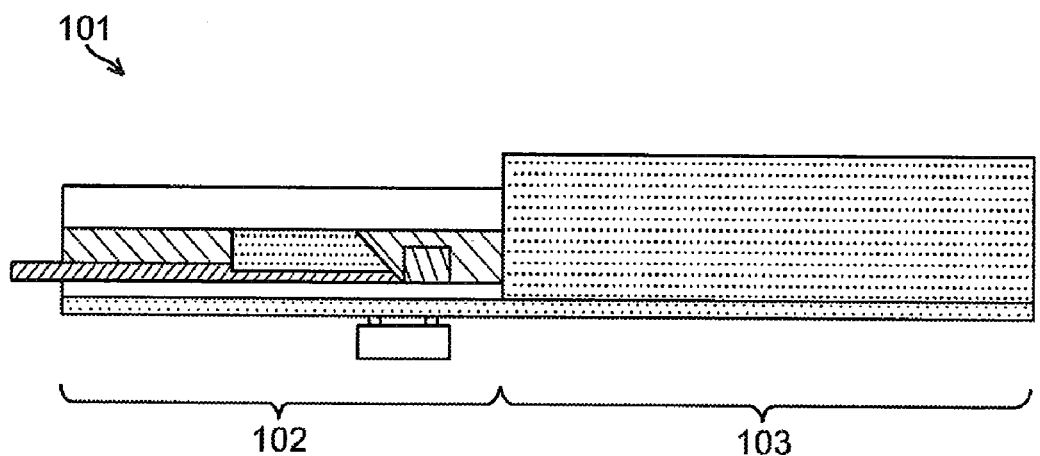
FIG. 10 is a horizontal cross-section view of the optical interconnection component of another embodiment of the present invention.

In the optical interconnection component 1 shown in FIG. 10, the substrate 2 is composed of the flexible-and-rigid substrate including the flexible part 102 and the rigid part 103. The optical device 3 and the optical fiber 4 may be formed at the flexible part 102 by the fabrication method of the optical interconnection component according to the present invention. Electric parts which can not be mounted on the flexible part 102 to which bending stress is applied are mounted on the rigid part 103.

The optical fiber holder is formed by the photolithographic method as shown by FIGS. 2A to 2F in the fabrication steps of the optical interconnection component 1 shown in FIG. 1. Alternatively, the optical fiber holder may be formed by the die assembly having a convex and angulated groove.

At first, UV-curable resin material may be coated on the soda-lime glass and the flexible substrate (FPC). Next, a die assembly composed of transparent material such as quartz and having concave and convex parts to be used for forming the angulated groove may be pressed against the soda-lime glass and the flexible substrate (FPC) on which UV-curable resin material is coated. Finally, UV-curable resin material may be cured by irradiating a ultraviolet light, and then the final component may be completed by removing the die assembly.

Alternatively, at first, thermoplastic resin material may be coasted on the soda-lime glass and the flexible substrate (FPC). Next, a die assembly heated up to the temperature at which thermoplastic resin material is melted and having concave and convex parts to be used for forming the angulated groove may be pressed against the soda-lime glass and the flexible substrate (FPC) on which thermoplastic resin material is coated. Finally, thermoplastic resin material may be cured by cooling the die assembly, and then the final component may be completed by removing the die assembly.

Figure 11A:
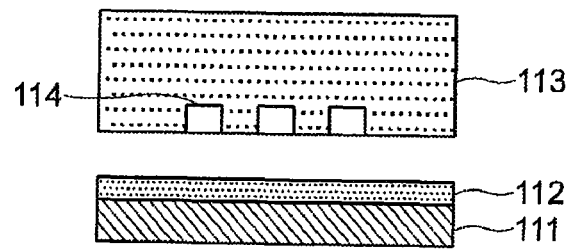
FIG. 11A to FIG. 11E each is a vertical cross-section view of the fiber holder and its composition members illustrating a step of fabricating the optical fiber holder according to the present invention.
Figure 11B:
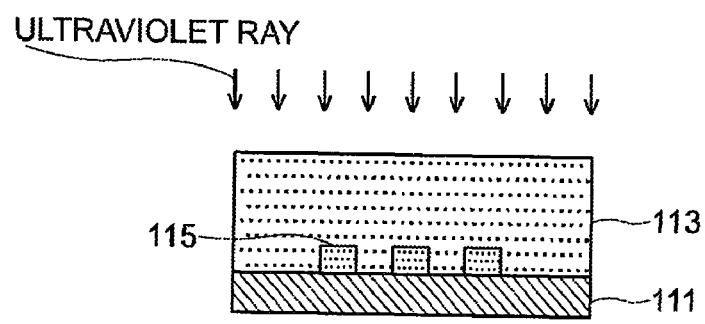
Figure 11C:
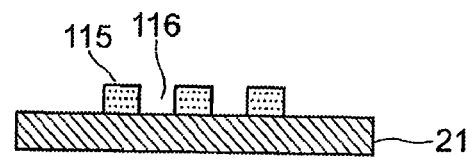
Figure 11D:
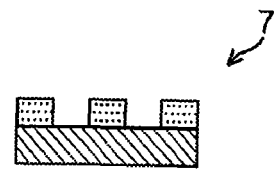
Figure 11E:
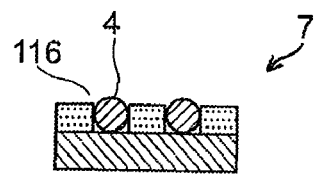

FIGS. 11A to 11E shows the steps for fabricating the optical fiber holder 7 by using a die assembly method. At first, as shown in FIG. 11A, the photo-curable material layer 112 may be formed on the single side of the soda-lime glass 111. The die assembly 113 has a concave groove part 114 used for forming a convex part 115. Next, as shown in FIG. 11B, the convex part 115 composed of the photo-curable material is formed inside the die assembly 113 by overlaying the die assembly 113 on the photo-curable material layer 112. The ultraviolet light is irradiated at this state in case that the photo-curable material is UV-curable acrylic resin, and the die assembly 113 may be composed of the material through which ultraviolet light can transmit. Next, as shown in FIG. 11C, when removing the die assembly 113, the cured convex part 115 remains and the angulated groove 116 is formed between the adjacent convex parts 115. Finally, as shown in FIG. 11D, when removing the externally extended parts of the soda-lime glass 11, the optical fiber holder 7 may be completed. As shown in FIG. 11E, the width of the individual groove of the optical fiber holder 7 is almost the same as the diameter of the optical fiber 4 and the depth of the individual groove is larger than the radius of the optical fiber 4 and smaller than the diameter of the optical fiber 4 so that the optical fiber 4 may be engaged firmly into the groove 116.

Figure 12A:
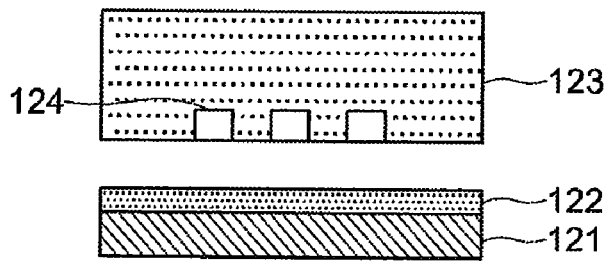
FIG. 12A to FIG. 12E each is a vertical cross-section view of the fiber holder and its composition members illustrating a step of fabricating the optical fiber holder according to the present invention.
Figure 12B:
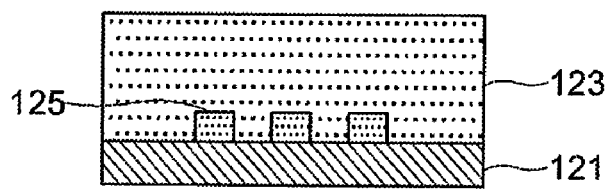
Figure 12C:
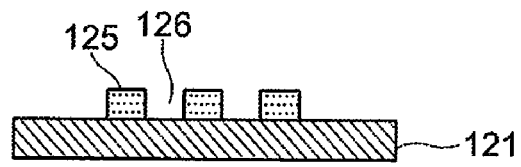
Figure 12D:
Figure 12E:
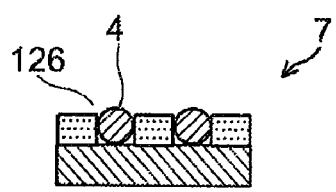

FIGS. 12A to 12E shows another example of steps for fabricating the optical fiber holder 7 by using die assembly method. At first, as shown in FIG. 12A, the thermoplastic material layer 122 may be formed on the single side of the soda-lime glass 121. The die assembly 123 has a concave groove part 124 used for forming a convex part 125. Next, as shown in FIG. 12B, the convex part 125 composed of the thermoplastic material is formed inside the die assembly 123 by pressing the die assembly 123 heated up to the temperature at which thermoplastic material layer 122 is melted against the soda-lime glass 121 on which thermoplastic material layer is formed. At this state, the whole members may be cooled, and thereby the convex part 125 may be cured. Next, as shown in FIG. 12C, when removing the die assembly 123, the cured convex part 125 remains and the angulated groove 126 is formed between the adjacent convex parts 125. Finally, as shown in FIG. 12D, when removing the externally extended parts of the soda-lime glass 121, the optical fiber holder 7 may be completed. As shown in FIG. 12E, the width of the individual groove of the optical fiber holder 7 is almost the same as the diameter of the optical fiber 4 and the depth of the individual groove is larger than the radius of the optical fiber 4 and smaller than the diameter of the optical fiber 4 so that the optical fiber 4 may be engaged firmly into the groove 126.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments, which can be embodied within a scope encompassed and equivalent thereof with respect to the feature set out in the appended claims.

What is claimed is:

1. A fabrication method of an optical interconnection component in which a light emitting face of an optical device is arranged and fixed on a rear surface of a substrate, an optical fiber is wired on a surface of the substrate, and a 45-degree mirror is formed on the optical fiber so that the optical fiber may be coupled optically to said optical device, comprising the steps of:

forming an optical fiber holder, having at least one angulated groove to which said optical fiber is to be disposed, for directing the angulated groove in which said optical fiber is to be disposed towards said substrate and placed on the first surface of said substrate, the angulated groove having a square cross-section, wherein a width of the angulated groove is almost the same as a diameter of said optical fiber and a depth of the angulated groove is larger than a radius of said optical fiber and smaller than the diameter of said optical fiber;

forming a guide on the first surface of said substrate for guiding the optical fiber holder at a position where said optical fiber and said optical device are to be coupled optically;

forming said 45-degree mirror at said optical fiber by dicing said optical fiber holder and said optical fiber together at a state in which said optical fiber is disposed in said angulated groove;

disposing the optical fiber holder on a surface of said substrate;

guiding the optical fiber holder by said guide to the position where said optical fiber and said optical device are to be coupled optically, and fixing their relative position, and wherein the optical fiber and the optical fiber holder are fixed to the substrate by means of a bonding material with a refractive index smaller than a refractive index of a cladding of said optical fiber, and a spatial gap between a bank of said optical fiber holder and said substrate is filled by said bonding material.

2. The fabrication method of an optical interconnection component of claim 1, wherein said guide is be formed so as to include a top stopper part contacting to a diced top face of said optical fiber holder for fixing a relative position of the optical fiber holder in a longitudinal direction of an angulated groove, and a side stopper part contacting to an edge face of the optical fiber holder for fixing a relative position of the optical fiber holder in a width direction of an angulated groove.

3. The fabrication method of an optical interconnection component of claim 1, wherein a plurality of said angulated grooves more than the number of said optical devices are formed in parallel at said optical fiber holder, and a dummy optical fiber is disposed into the angulated groove where the optical fiber not coupled to the optical device is disposed.

4. The fabrication method of an optical interconnection component of claim 1, wherein a plurality of said angulated grooves more than the number of said optical devices are formed in parallel at said optical fiber holder, and an electric wire is disposed into the angulated groove where the optical fiber not coupled to the optical device is disposed.

5. The fabrication method according to claim 1, wherein the angulated groove is fabricated by an exposure method.

6. An optical interconnection component having a substrate; an optical device with its light emitting face being arranged on a rear surface of the substrate; an optical fiber wired on the first surface of the substrate; and a 45-degree mirror formed at the optical fiber so as to be coupled optically to said optical device, further comprising:

at least one angulated groove in which said optical fiber is to be disposed, the angulated groove having a square cross-section, wherein a width of the angulated groove is almost the same as a diameter of said optical fiber and a depth of the angulated groove is larger than a radius of said optical fiber and smaller than the diameter of said optical fiber;

an optical fiber holder for directing the angulated groove towards said substrate and placed on a surface of said substrate; and a guide formed on the first surface of said substrate for guiding said optical fiber holder at a position where said optical fiber and said optical device are to be coupled optically;

wherein said 45-degree mirror is formed at said optical fiber by dicing said optical fiber holder and said optical fiber together at a state in which said optical fiber is disposed in said angulated groove, and wherein the optical fiber and the optical fiber holder are fixed to the substrate by means of a bonding material with a refractive index smaller than a refractive index of a cladding of said optical fiber, and a spatial gap between a bank of said optical fiber holder and said substrate is filled by said bonding material.

7. The optical interconnection component according to claim 6, wherein the angulated groove is fabricated by an exposure method.

* * * * *